US005228892A

United States Patent [19]

Akitsu et al.

[11] Patent Number: 5,228,892

[45] Date of Patent: Jul. 20, 1993

[54] EXHAUST EMISSION CONTROL DEVICE

[75] Inventors: Yasuo Akitsu, Handa; Hideyuki Masaki, Hashima; Hiroyuki Okahara, Handa, all of Japan

[73] Assignee: NGK Insulators, Ltd., Japan

[21] Appl. No.: 840,071

[22] Filed: Feb. 25, 1992

[30] Foreign Application Priority Data

Feb. 25, 1991 [JP] Japan .................................. 3-53780

[51] Int. Cl.5 ............................................ B01D 46/00

[52] U.S. Cl. ........................................ 55/523; 55/302; 60/311

[58] Field of Search ..................... 55/523, 302; 60/311

[56] References Cited

U.S. PATENT DOCUMENTS

| | | | |
|---|---|---|---|
| 4,238,455 | 12/1980 | Ogiwara | 422/171 |
| 4,324,701 | 4/1982 | Honda et al. | 252/477 |
| 4,709,549 | 12/1987 | Lepperhoff | 60/295 |
| 4,814,146 | 3/1989 | Brand et al. | 422/179 |
| 4,859,428 | 8/1989 | Brand et al. | 422/179 |
| 4,875,335 | 10/1989 | Arai et al. | 60/311 |
| 5,065,574 | 11/1991 | Bailey | 60/311 |

FOREIGN PATENT DOCUMENTS

| | | |
|---|---|---|
| 0089127 | 9/1983 | European Pat. Off. . |
| 0197884 | 10/1986 | European Pat. Off. . |
| 0233509 | 8/1987 | European Pat. Off. . |
| 0239752 | 10/1987 | European Pat. Off. . |
| 0393729 | 10/1990 | European Pat. Off. . |
| 1-159408 | 6/1989 | Japan . |
| 3046921 | 9/1981 | United Kingdom . |

*Primary Examiner*—Bernard Nozick

*Attorney, Agent, or Firm*—Parkhurst, Wendel & Rossi

[57] ABSTRACT

An exhaust emission control device includes a single filter assembly composed of a pair of side plates respectively formed in an L-letter shape in cross-section and integrally assembled in a square framework having inlet and outlet openings, and a plurality of ceramic filter elements aligned in parallel within the square framework and clamped by the side plates. The filter elements are each made of porous ceramic material and have a thin-walled cellular structure square in cross-section formed with a plurality of axially extending passages separated from each other by thin partition walls, wherein a first group of the passages are closed at their one ends in a checked pattern and opened at their other ends to introduce therein exhaust gases to be purified, while a second group of the passages are opened at their one ends to discharge purified gases therefrom and closed at their other ends in a checked pattern.

7 Claims, 3 Drawing Sheets

EXHAUST EMISSION CONTROL DEVICE

BACKGROUND OF THE INVENTION

1. Field of the Invention

The present invention relates to an exhaust emission control device for purifying various exhaust gases discharged from internal combustion engines or diesel engines of automotive vehicles, industrial machines or various factory plants.

2. Description of the Prior Art

To avoid air pollution caused by various exhaust gases containing various inflammable and nonflammable fine particles, there have been various exhaust emission control methods and devices for purifying the exhaust gases. In Japanese Patent Laid-open Publication No. 1-159408 there is disclosed one of such exhaust emission control devices which includes a casing arranged above an electric furnace and a ceramic filter element disposed within the casing to collect fine particles from exhaust gases introduced into an inlet opening of the casing and to cause the collected fine particles to fall into the electric furnace. In this device, the ceramic filter element has a thin-walled cellular or honeycomb structure formed with a plurality of axially extending passages which are separated from each other by thin partition walls and closed at opposite ends thereof in an alternating checked pattern.

In such a conventional exhaust emission control device as described above, only a single ceramic filter element is adapted to purify exhaust gases introduced therein. As a result, the gas purifying performance of the device is greatly limited. To enhance the gas purifying performance of the device, it is required to provide a plurality of ceramic filter elements in a limited space.

SUMMARY OF THE INVENTION

It is, therefore, a primary object of the present invention to provide an exhaust emission control device wherein a plurality of ceramic filter elements are assembled as a single unit and disposed within a limited space to provide a higher gas purifying performance than that of the conventional exhaust emission control device described above.

According to the present invention, the primary object is attained by providing an exhaust emission control device which includes a single filter assembly composed of a pair of side plates respectively formed in an L-letter shape in cross-section and intergrally assembled in a square framework having inlet and outlet openings at opposite ends, and a plurality of ceramic filter elements aligned in parallel within the square framework and clamped by the side plates, the filter elements each being made of porous ceramic material and having a thin-walled cellular structure of square cross-section formed with a plurality of axially extending passages separated from each other by thin partition walls, wherein a first group of the passages are closed at their one ends in a checked pattern and opened at their other ends to introduce therein exhaust gases to be purified, while a second group of the passages are opened at their one ends to discharge purified gases therefrom and closed at their other ends in a checked pattern.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
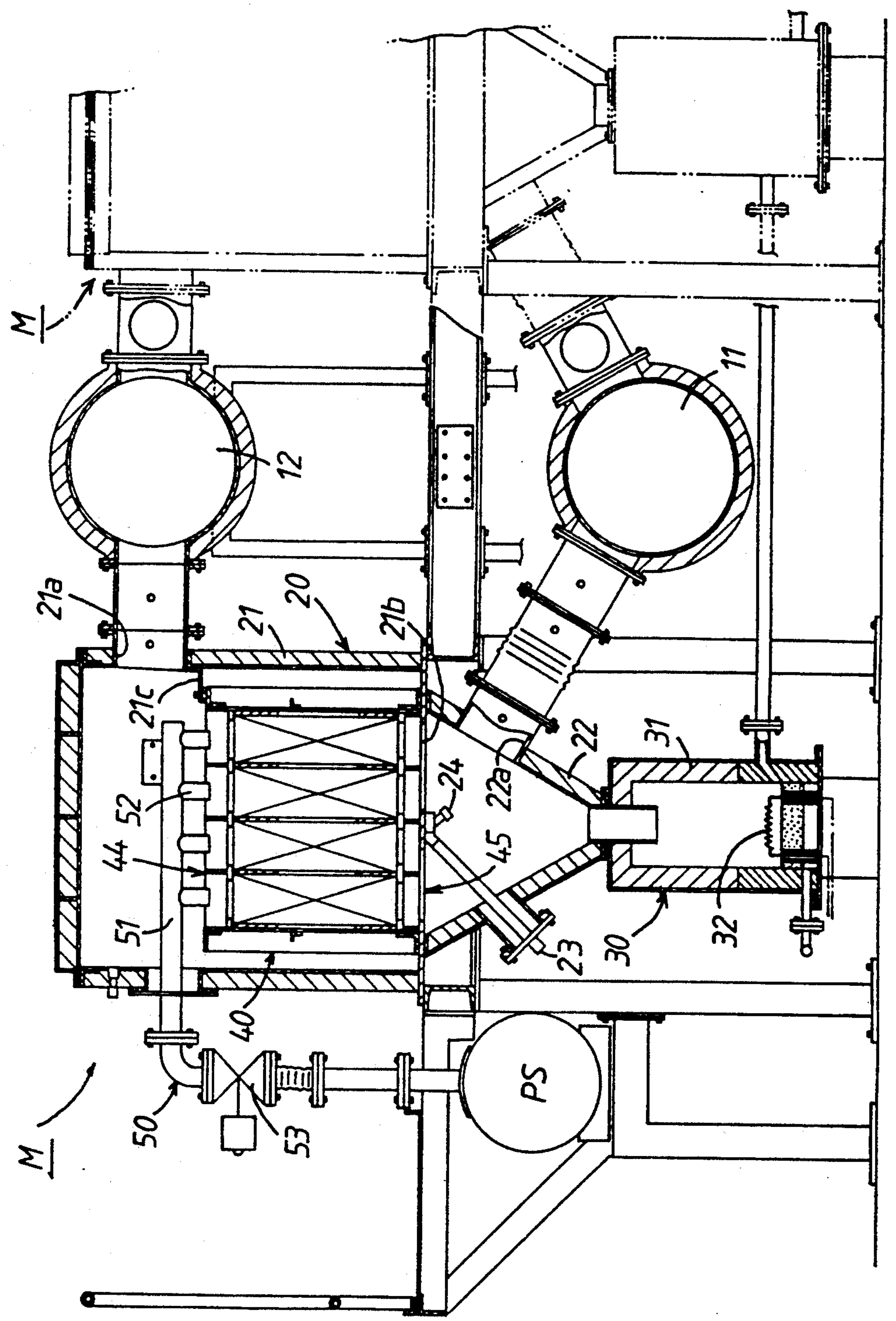
FIG. 1 is a sectional view of an exhaust emission control system in accordance with the present invention.

In FIG. 1 of the drawings, there is illustrated an exhaust emission control system for purifying exhaust gases discharged from a diesel engine installed in a factory plant. The emission control system is composed of plural pairs of exhaust emission control devices M arranged in parallel in a fore-and-aft direction. Arranged between the plural pairs of emission control devices M are a supply duct 11 for introducing exhaust gases from the diesel engine into the respective emission control devices M and a discharge duct 12 for discharging purified gases from the respective emission control devices M. The emission control devices M each include an upright housing 20 of square cross-section mounted on a frame construction, an electric furnace 30 arranged under the upright housing 20, and a filter assembly 40 housed within the upright housing 20 and a reverse washing mechanism 50.

The upright housing 20 is composed of a housing body 21 and a pyramidal hopper 22 assembled with the bottom portion of housing body 21 and located above the electric furnace 30. The hopper 22 has an inlet port **22*a* formed at its peripheral wall and connected in an air-tight manner to the supply duct 11. The housing body 21 has an outlet port 21*a* formed at its peripheral wall and connected in an air-tight manner to the discharge duct 12. The hopper 22 is connected at its lower end to an upper end wall of a furnace body 31 by means of a connecting pipe. Arranged within the furnace body 31 is an electric heater 32 for burning fine particles falling thereon from the hopper 22. The reverse washing mechanism 50 has an air supply pipe 51 located above the filter assembly 40. A steam supply pipe 23 is inserted into the hopper 22 and connected to a jet nozzle 24 mounted to a perforated bottom plate 21*b* of housing body 21**.

Figure 2:
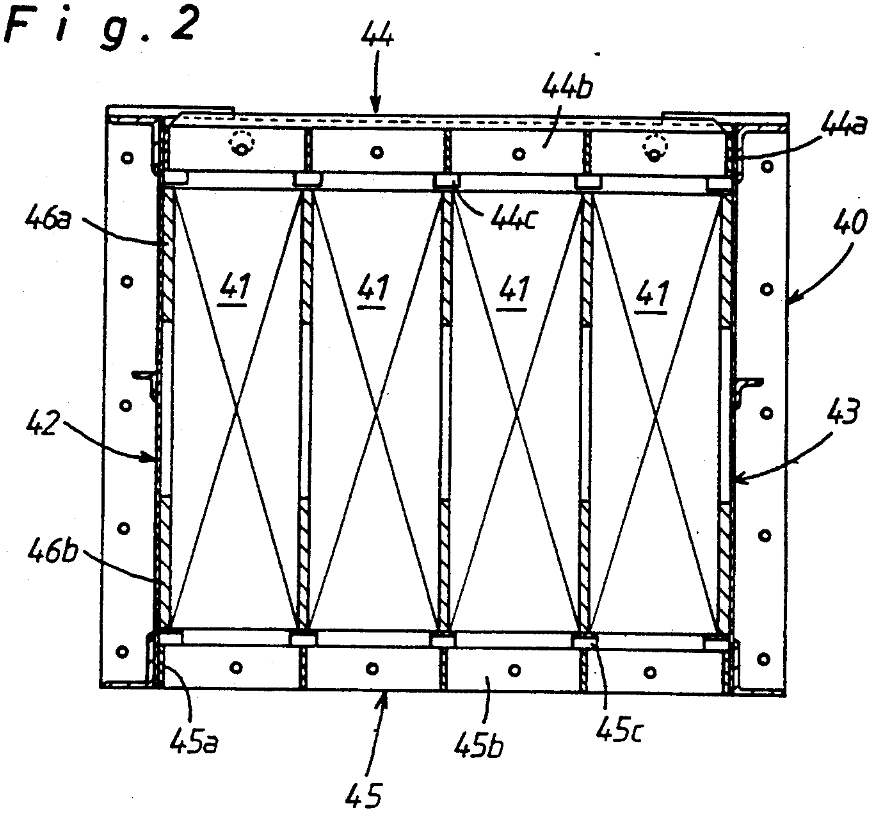
FIG. 2 is an enlarged sectional view of a filter assembly shown in FIG. 1.
Figure 3:
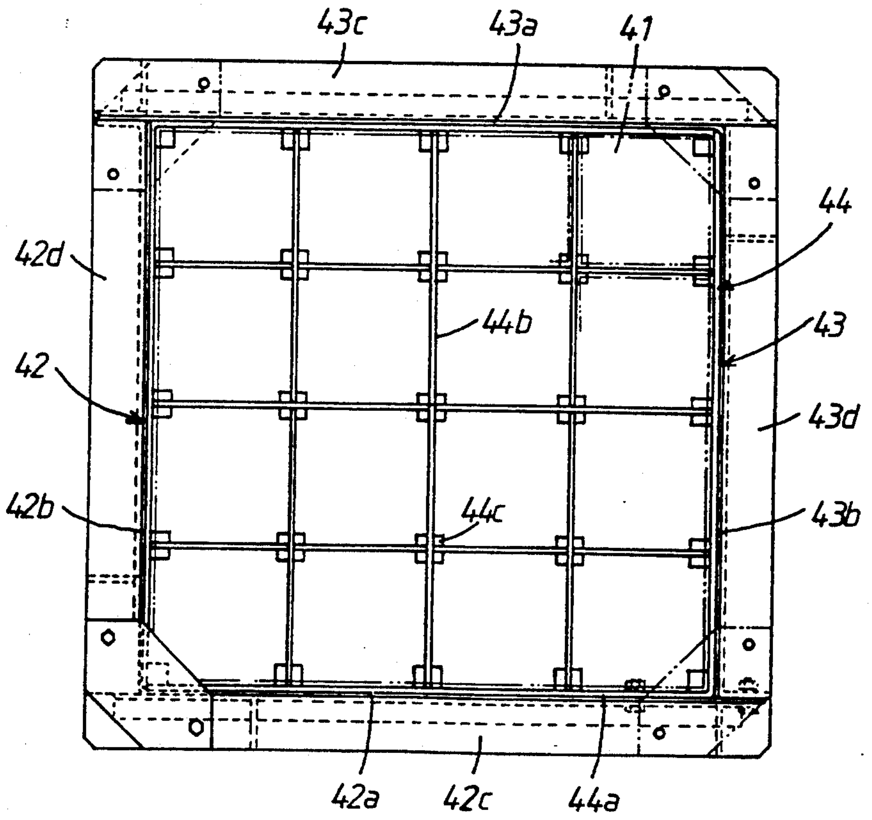
FIG. 3 is a plan view of the filter assembly shown in FIG. 2.
Figure 4:
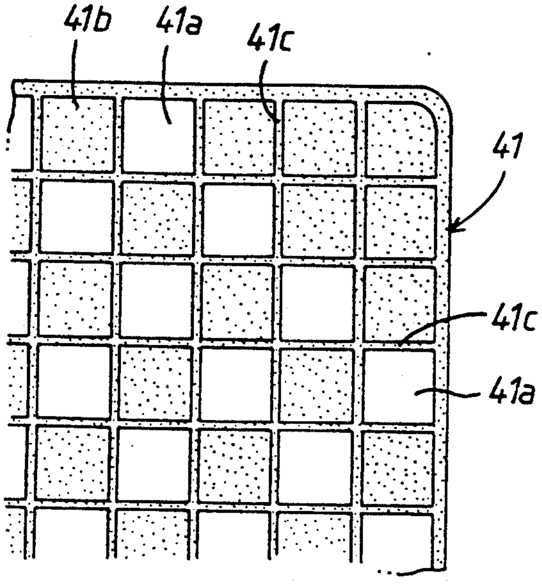
FIG. 4 is a partly enlarged bottom view of one of the filter elements shown in FIG. 2.
Figure 5:
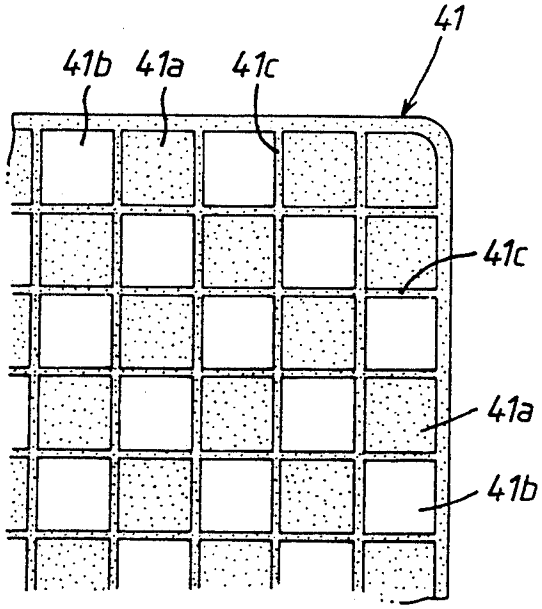
FIG. 5 is a partly enlarged plan view of the filter element shown in FIG. 4.

As shown in FIGS. 2 and 3, the filter assembly 40 is composed of sixteen ceramic filter elements 41 aligned in parallel and clamped by a pair of side plates 42 and 43. The clamped filter elements 41 are supported by a support frame 45 at their bottom ends. In this embodiment, the number of ceramic filter elements 41 has been determined in consideration with prevention of gas leakage among the filter elements 41 and allowable space in the housing body 21. The ceramic filter elements 41 each are made of porous ceramic material and have a thin-walled cellular or honey-comb structure of square cross-section formed with a plurality of axially extending passages **41*a*, 41*b* separated from each other by thin partition walls 41*c*. As shown in FIGS. 4 and 5, a first group of filter passages 41*a* are closed at their upper ends in a checked pattern and opened downwardly at their lower ends to introduce the exhaust gases therein, while a second group of filter passages 41***b* which account for substantially all remaining passages not closed at their upper ends, are closed at their lower ends in a checked pattern and opened upwardly at their upper ends to discharge purified gases therefrom. The thin partition walls 41*c* of element 41 each act as a filter to collect fine particles from the exhaust gases permeating therethrough.

As shown in FIG. 3, the side plates 42, 43 each are formed in an L-letter shape in cross-section to be longer at their one side portions 42*a*, 43*a* than the whole side width of four filter elements 41 aligned in a lateral direction and to be approximately the same at their other side portions 42*b*, 43*b* as the whole side width of four filter elements 41 aligned in a fore-and-aft direction. The side plates 42, 43 are provided with brackets 42*c*, 42*d*, 43*c*, 43*d* respectively secured to their side portions 42*a*, 42*b*, 43*a*, 43*b*. In addition, the side plates 42, 43 are formed higher in a predetermined length than the filter elements 41 as shown in FIG. 2.

As shown in FIG. 2, the filter elements 41 each are enclosed by sealing members 46*a*, 46*b* at their upper and lower portions and clamped by the side plates 42, 43. The sealing members 46*a*, 46*b* each are made of ceramic fiber and adhered to the upper and lower portions of the respective filter elements 41 by means of inorganic adhesive. The sealing members 46*a*, 46*b* each are coated with a surface hardening agent at their opposite ends. Thus, the sealing members 46*a* and 46*b* are interposed among the filter elements 41 and between the respective filter elements 41 and side plates 42, 43 at the upper and lower portions of the filter assembly 40.

As shown in FIGS. 2 and 3, the upper support frame 44 is composed of a square framework member 44*a* formed to correspond with the top edge of the filter assembly 40 and a plurality of crossbeam members 44*b* integrally assembled with the framework member 44*a* in the form of latticework to correspond with each top edge of the filter elements 41. Similarly, the lower support frame 45 is composed of a square framework member 45*a* formed to correspond with the bottom edge of the filter assembly 40 and a plurality of crossbeam members 45*b* integrally assembled with the framework member 45*a* in the form of latticework to correspond with each bottom edge of the filter elements 41.

The upper support frame 44 further includes a plurality of U-letter shaped support members 44*c* secured to each intersected portion of the framework member 44*a* and cross-beam members 44*b*. The upper support frame 44 is fixedly coupled within the upper end portion of the integrally assembled side plates 42, 43 in such a manner that the support members 44*c* are positioned above the respective top end corners of filter elements 41 to restrict upward movement of the filter elements 41. Thus, the framework member 44*a* and crossbeam members 44*b* act to ensure the support strength of the filter assembly 40 and to prevent outward flow of the compressed air supplied therein in reverse washing operation.

Similarly to the upper support frame 44, the lower support frame 45 includes a plurality of U-letter shaped support members 45*c* secured to each intersected portion of the framework member 45*a* and crossbeam members 45*b* for engagement with the respective bottom end corners of filter elements 41. The lower support frame 44 is fixedly coupled within the bottom end portion of the integrally assembled side plates 42, 43 in such a manner that the support members 45*c* are engaged with the respective bottom end corners of filter elements 41 to support the filter elements 41 thereon. In the exhaust emission control device M, the filter assembly 40 is detachably mounted on the perforated bottom plate 21*b* of housing body 21 and fixed at its upper end to the housing body 21 by means of a bracket 21*c*. The air supply pipe 51 extended into the housing body 21 has a plurality of outlet pipes 52 which are extended into respective opening spaces enclosed by the crossbeam members 44*b* and faced to the respective top ends of filter elements 41.

In operation, exhaust gases discharged from the diesel engine are supplied into the hopper 22 through the supply duct 11 and introduced into the inlet passages 41*a* of filter elements 41. In this instance, the thin partition walls 41*c* of filter elements 41 act to collect fine particles from the exhaust gases permeating therethrough into the outlet passages 41*b* of filter. Thus, the purified gases are discharged from the outlet passages 41*b* of filter elements 41 into the discharge duct 12, while the fine particles are accumulated on the surfaces of partition walls 41*c*. During such treatment of the exhaust gases, an electromagnetic valve 53 of the reverse washing mechanism 50 is opened under control of an electric control apparatus (not shown) to supply compressed air from a pneumatic pressure source PS into the air supply pipe 51. The compressed air spurts out of the outlet pipes 52 and flows into the outlet passages 41*b* of filter elements 41 to flow into the inlet passages 41*a* through the partition walls 41*c*. Thus, the accumulated fine particles are separated from the partition walls 41*c* and fall into the electric furnace 30. In the electric furnace 30, inflammable particles are burned and discharged with nonflammable particles outwardly.

As is understood from the above description, the exhaust emission control device M is characterized in that the plurality of filter elements 41 assembled as a single unit are disposed within a limited space in the housing body 21 to provide a higher gas purifying performance than that of a conventional emission control device with a single filter element. Since the filter elements 41 are retained in place by clamping of the side plates 42, 43, a sufficient support strength of filter elements 41 can be obtained in a compact construction. Thus, the filter assembly 40 can be mounted within the housing body 21 in a stable condition to maintain the higher gas purifying performance for a long period of time without causing any damage of filter elements 41. In addition, the support of the filter assembly 40 by means of the upper and lower support frames 44 and 45 is effective to more stably retain the filter assembly 40 against fluctuating stress applied thereto within the housing body 21.

In the exhaust emission control device M, the upper and lower sealing members 46*a*, 46*b* interposed among the filter elements 41 and side plates 42, 43 are effective to prevent leakage of exhaust gases from the filter elements 41 and to avoid the occurrence of damage of filter elements 41 during a clamping process thereof. The sealing members 46*a*, 46*b* are also useful to absorb thermal expansion of the metal fittings for the filter assembly 40 and to protect the filter elements 41 from thermal stress applied thereto. In the filter assembly 40, the filter elements 41 are supported at their respective bottom end corners by engagement with the U-letter shaped support members 45*c* respectively secured to the intersected portions of the lower crossbeam members

45*b*. The support members 45*c* are useful to eliminate stress concentration in the filter elements 41. In this respect, it is noted that the upper support members 44*c* are slightly spaced from the top ends of filter elements 41 in a vertical direction to absorb irregularity of the filter elements in vertical size. Preferably, the upper support members 44*c* are resiliently engaged with the top end corners of filter elements 41 through appropriate resilient members to more stably retain the filter elements 41 in place.

In the filter assembly 40, the inlet and outlet passages 41*a*, 41*b* of the respective filter elements 41 are closed at portions facing the support members 44*c*, 45*c* to avoid damage of the filter elements 41 at their supported portions. At the bottom end of filter assembly 40, the U-letter shaped lower support members 45*c* are spaced from the crossbeam members 45*b* to permit the flow of exhaust gases passing thereacross. This is useful to uniformly introduce the exhaust gases into the respective filter elements 41. In the exhaust emission control device M, the framework member 44*a* and crossbeam members 44*b* of upper support frame 44 are formed to have a predetermined vertical width for stably introducing the compressed air from the air supply pipe 51 into the respective filter elements 41 in reverse washing operation.

What is claimed is:

1. An exhaust emission control device for purifying exhaust gases applied thereto, comprising a single filter assembly comprising:

a pair of vertical side plates respectively formed in a L-letter shape in cross-section, each of said side plates including a short side and a long side, said side plates being integrally assembled to form a square frame having inlet and outlet openings at opposite ends;

a plurality of ceramic filter elements aligned in parallel within said square frame and clamped by said side plates, each of said filter elements being made of porous ceramic material and having a thin walled cellular structure of square cross-section formed with a plurality of axially extending passages separated from each other by thin partition walls, wherein a first group of said passages are closed at their one ends in a checked pattern and opened at their other ends to introduce therein exhaust gases to be purified, while a second group of said passages are opened at their one ends to discharge purified gases therefrom and closed at their other ends in a checked pattern;

upper and lower support frames, at least the lower support frame providing additional support for each of said filter elements across the inlet opening of said square frame; and clamping means for clamping said side plates and said upper and lower support frames to form an integral assembly.

2. An exhaust emission control device as claimed in claim 1, wherein each of said filter elements is enclosed by a sealing member and clamped to said side plates through said sealing member to prevent leakage of exhaust gases therefrom.

3. An exhaust emission control device as claimed in claim 1, wherein each of said filter elements is enclosed by a pair of axially spaced sealing members at opposite end portions of said filter elements and clamped by said side plates through said sealing members to prevent leakage of exhaust gases therefrom.

4. An exhaust emission control device as claimed in claim 1, wherein said lower support frame is fixedly coupled within the inlet opening portion of said integrally assembled side plates, said lower support frame including a square framework member formed to correspond with the inlet opening of the integrally assembled side plates and a plurality of crossbeam members integrally assembled with said framework member in the form of latticework to correspond with each one end of said filter elements.

5. An exhaust emission control device as claimed in claim 4, where said upper support frame is fixedly coupled within the outlet opening portion of said integrally assembled side plates to restrict outward movement of said filter elements, said upper support frame including a square framework member formed to correspond with the outlet opening of said integrally assembled side plates, a plurality of crossbeam members integrally assembled with said upper support frame in the form of lattice-work to correspond with each other end of said filter elements, and a plurality of U-letter shaped support members secured to each intersected portion of said upper support frame and crossbeam members to face respective other end corners of said filter elements.

6. An exhaust emission control device as claimed in claim 4, wherein said lower support frame further includes a plurality of U-letter shaped support members secured to each intersected portion of said framework member and crossbeam members for engagement with respective one end corners of said filter elements.

7. An exhaust emission control device as claimed in claim 6, wherein the first group of said passages are closed at portions facing said U-letter shaped support members.

* * * * *